(12) United States Patent
Lee

(10) Patent No.: US 7,277,926 B1
(45) Date of Patent: Oct. 2, 2007

(54) BUSINESS METHOD AND USER INTERFACE FOR REPRESENTING BUSINESS ANALYSIS INFORMATION SIDE-BY-SIDE WITH PRODUCT PAGES OF AN ONLINE STORE

(75) Inventor: Juhnyoung Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1372 days.

(21) Appl. No.: 09/672,363

(22) Filed: Sep. 28, 2000

(51) Int. Cl.
*G06F 15/16* (2006.01)
*G06F 17/30* (2006.01)

(52) U.S. Cl. .................. 709/218; 709/224; 715/745

(58) Field of Classification Search ............... 709/206, 709/224, 217–219; 705/26, 27, 28; 715/744, 715/736; 713/201; 702/186
See application file for complete search history.

(56) References Cited

U.S. PATENT DOCUMENTS

| | | | | |
|---|---|---|---|---|
| 5,870,559 A | * | 2/1999 | Leshem et al. | 709/224 |
| 5,931,912 A | * | 8/1999 | Wu et al. | 709/224 |
| 6,226,752 B1 | * | 5/2001 | Gupta et al. | 713/201 |
| 6,304,904 B1 | * | 10/2001 | Sathyanarayan et al. | 709/224 |
| 6,393,479 B1 | * | 5/2002 | Glommen et al. | 709/224 |
| 6,484,149 B1 | * | 11/2002 | Jammes et al. | 705/26 |
| 6,601,100 B2 | * | 7/2003 | Lee et al. | 709/226 |
| 6,606,581 B1 | * | 8/2003 | Nickerson et al. | 702/186 |
| 6,629,135 B1 | * | 9/2003 | Ross, Jr. et al. | 715/744 |
| 6,651,066 B2 | * | 11/2003 | Baxter et al. | 707/10 |
| 6,789,115 B1 | * | 9/2004 | Singer et al. | 709/224 |
| 2002/0198939 A1 | * | 12/2002 | Lee et al. | 709/203 |

OTHER PUBLICATIONS

R. Cooley, B. Mobasher, J. Srivastava, "Data Preparation for Mining World Wide Web Browsing Patterns," *Journal of Knowledge and Information Systems*, 1(1), 1999, 26 pages.

* cited by examiner

*Primary Examiner*—Patrice Winder
(74) *Attorney, Agent, or Firm*—Harrington & Smith, PC

(57) ABSTRACT

A computer interface to an online store is also used in a business method. The interface has one or more product pages that have product information about one or more products. The product information is obtained from the online store. An analysis data window is presented concurrently with and in proximity to the respective product page. The analysis data window has analysis data about the effectiveness of the respective product page. In a preferred embodiment, the type of analysis data is determined by a type (class) of analyst that uses the interface. A method of doing business uses the interface to determine the effectiveness of and improve various information presented on the product page.

29 Claims, 13 Drawing Sheets

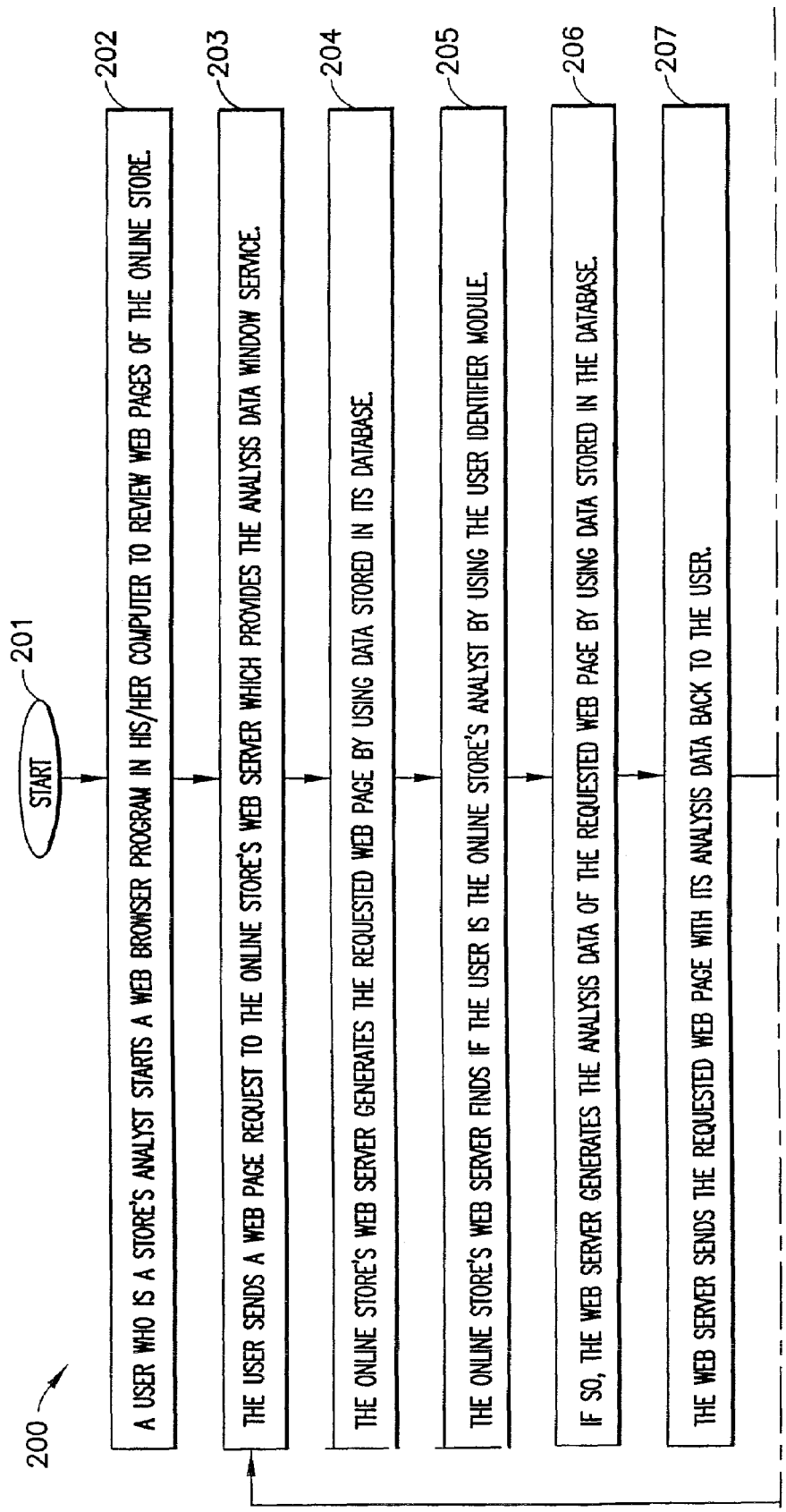

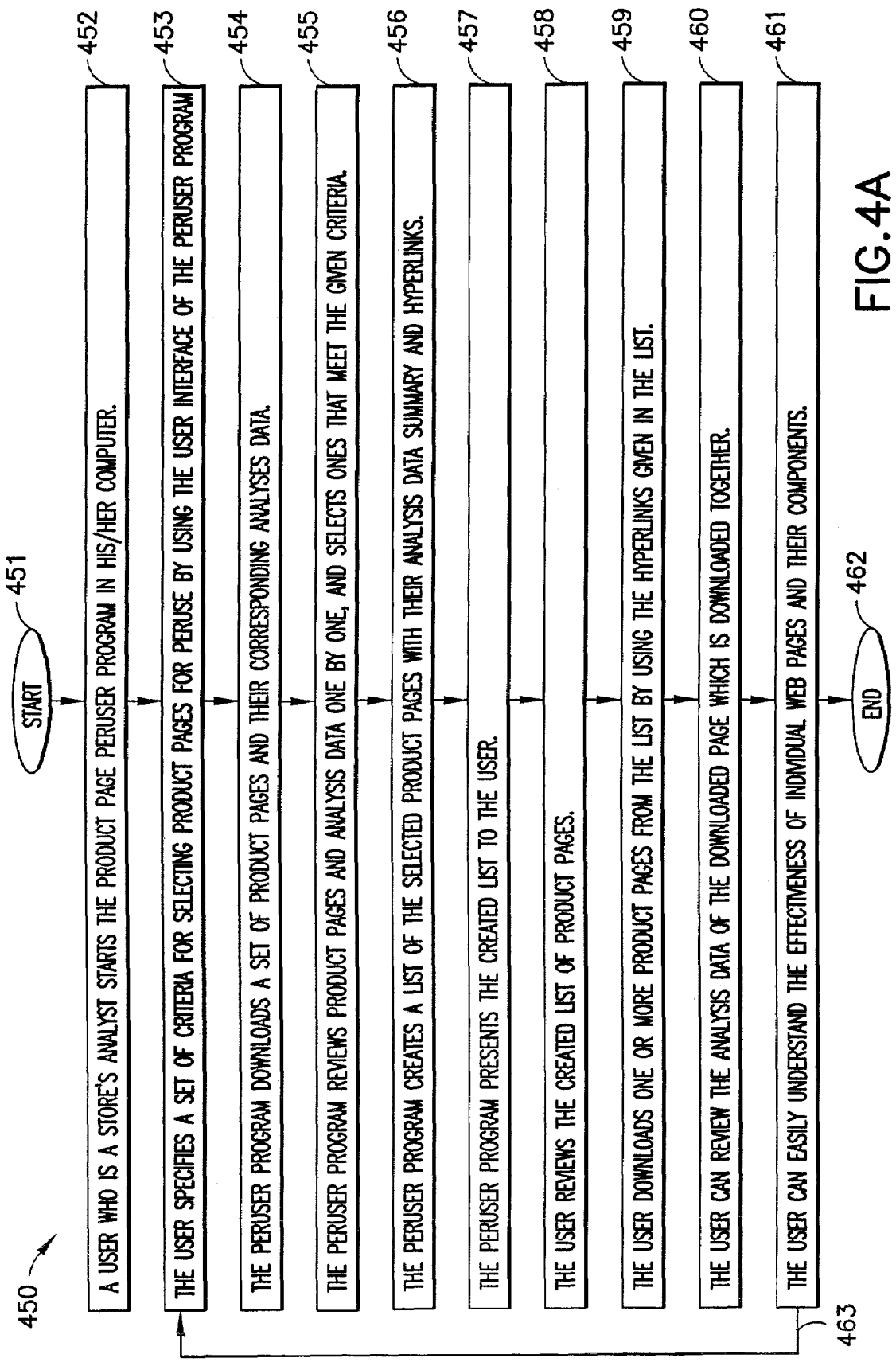

600

```
ANALYSIS DATA ON PRODUCT A
```

| DIMENSIONS | |
|---|---|
| TIME | MAY 2000 |
| CUSTOMER | ALL |
| MERCHANDISING CUES | PROMOTION A |
| SHOPPING METAPHORS | ALL |

— 601

| COUNT MEASURES | |
|---|---|
| # OF BASKET PLACEMENTS | 8293 |
| # OF PURCHASES | 3721 |
| # OF RETURNS | 98 |

— 602

| DERIVED MEASURES | |
|---|---|
| # OF PURCHASES/OF BASKET PLACEMENTS | 44.8% |
| # OF RETURNS/# OF PURCHASES | 2.6% |

— 603

| SALES MEASURES | |
|---|---|
| SALES VALUE | $187,217 |
| PROFIT | $2,892 |

— 604

| SUPPORTING DATA | |
|---|---|
| AVERAGE PRICE | $23 |
| AVERAGE PROFIT MARGIN | 1.5% |

ANALYSIS DATA ON PRODUCT A's PRODUCT PAGE

| DIMENSIONS | |
|---|---|
| TIME | MAY 2000 |
| CUSTOMER | ALL |
| MERCHANDISING CUES | PROMOTION A |
| SHOPPING METAPHORS | ALL |

— 701

| COUNT MEASURES | |
|---|---|
| # OF IMPRESSIONS | 942,639 |
| # OF CICKTHROUGHS | 163,327 |

— 702

| DERIVED MEASURES | |
|---|---|
| # OF CLICKTHROUGHS/# OF IMPRESSIONS | 17% |
| # OF BASKET PLACEMENTS/# OF CLICKTHROUGHS | 5% |
| # OF PURCHASES/# OF BASKET PLACEMENTS | 44.8% |
| # OF PURCHASES/# OF IMPRESSIONS | 0.4% |
| # OF PURCHASES/# OF CLICKTHROUGHS | 2.3% |

— 703

| SALES MEASURES | |
|---|---|
| SALES VALUE | $187,217 |
| PROFIT | $2,892 |

— 704

| SUPPORTING DATA | |
|---|---|
| AVERAGE PRICE | $23 |
| AVERAGE PROFIT MARGIN | 1.5% |

ANALYSIS DATA ON COMPONENTS OF PRODUCT A's PRODUCT PAGE

DIMENSIONS
   TIME                                     MAY 2000
   CUSTOMER                         ALL
   MERCHANDISING CUES       PROMOTION A
   SHOPPING METAPHORS       ALL — 801

HYPERLINK A
   TYPE                                 BANNER AD
   # OF IMPRESSIONS             942,639
   # OF CLICKTHROUGHS         7,329
   # OF BASKET PLACEMENTS    982
   # OF PURCHASES                615 — 802

HYPERLINK B
   TYPE                                 CROSS-SELL
   # OF IMPRESSIONS             942,639
   # OF CLICKTHROUGHS        18,781
   # OF BASKET PLACEMENTS   1,567
   # OF PURCHASES                871 — 803

FIG.8

BUSINESS METHOD AND USER INTERFACE FOR REPRESENTING BUSINESS ANALYSIS INFORMATION SIDE-BY-SIDE WITH PRODUCT PAGES OF AN ONLINE STORE

FIELD OF THE INVENTION

This invention relates to shopping over a computer network. More specifically, the invention relates to shopping over the Internet where merchants and/or business analysts of an online store can examine the analysis data of individual components of their store such as products, product pages and hyperlinks side-by-side with Web pages presenting the components.

BACKGROUND OF THE INVENTION

Commerce over networks; particularly e-commerce over the Internet, has increased significantly over the past few years. Part of e-commerce enables users/customers to access information of products and to purchase them from various commercial Web sites (i.e. online stores). There are numerous online stores currently operating in the Internet including: Amazon.com, etoys.com, Buy.com, Wal-Mart.com, LLBean.com, and Macys.com. These online stores provide various customer services to make commerce activities possible over Web sites. Some of the examples of the basic services are catalogs of merchandise which are both browsable and searchable by various product attributes (e.g., keyword, name, manufacturer, and model number), shopping carts, and checkout process. Some online stores also provide advanced customer services such as wish lists, gift registries, calendars, custom-configuration of products, buyer's groups, chatting, e-mail notification, and in-context sales.

Any Web site owner, any online merchant needs to know whether the Web site or online store effectively serves its intended purpose; that is, how many shoppers visit the Web site, who these shoppers are, what they want, and what they do at the store while they are there. The ability to analyze and understand traffic flow, the way shoppers navigate from page to page in a store, and the effectiveness of various components in an online store such as products, product pages, hyperlinks, Web design features, and customer services, is critical for successful product marketing and sales. Recommendations for improving the effectiveness of online store can be created and implemented based on the analysis results.

PROBLEMS WITH THE PRIOR ART

Much work has recently been done for analyzing and reporting on Web traffic and online store effectiveness, and a number of commercial products for analyzing and reporting on online store performance are available. One of the problem with the prior art is that it is usually difficult to understand and directly use the analysis result to update the online store, because their presentation of the analysis result is disconnected from the actual online store presentation. That is, the analysis result from the prior art tools is presented separately from the online store presentation by a different software tool. Hence it is the task of the online merchants and/or business analysts to connect the analysis results with the actual components (i.e., products, product pages, hyperlinks, applications and Web design features) of online stores and make appropriate recommendations for improving the effectiveness of the online store.

OBJECTS OF THE INVENTION

An object of this invention is an improved system and method for analyzing and reporting on the effectiveness of various components of an online store over a network.

An object of this invention is an improved system and method for analyzing and reporting on the effectiveness of various components of an online store over a network that provides an analysis data window side-by-side with the Web browser program while presenting one or more products in the Web browser program.

An object of this invention is an improved system and method for analyzing and reporting on the effectiveness of various components of an online store over a network that provides an analysis data window side-by-side with the Web browser program while presenting one or more products in the Web browser program and at the same time presenting the analysis data of individual components displayed in product pages in the analysis data window.

An object of this invention is an improved system and method for analyzing and reporting on the effectiveness of various components of an online store over a network that provides an analysis data window side-by-side with the Web browser program while presenting one or more products in the Web browser program, at the same time presenting the analysis data of individual components displayed in product pages in the analysis data window, and starting the analysis data window automatically by identifying the Web page requester's status.

An object of this invention is an improved system and method for analyzing and reporting on the effectiveness of various components of an online store over a network that provides an analysis data window side-by-side with the Web browser program while presenting one or more products in the Web browser program, at the same time presenting the analysis data of individual components displayed in product pages in the analysis data window, starting the analysis data window automatically by identifying the Web page requester's status, and updating the analysis data according to the product page displayed in the Web browser program.

SUMMARY OF THE INVENTION

The present invention is a computer interface to an online store that is also used in a business method. The interface has one or more product pages that have product information about one or more products. The product information is obtained from the online store. An analysis data window is presented concurrently with and in proximity to the respective product page. The analysis data window has analysis data about the effectiveness of the respective product page. In a preferred embodiment, the type of analysis data is determined by a type (class) of analyst that uses the interface. A method of doing business uses the interface to determine the effectiveness of and improve various information presented on the product page.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 4A is a flow chart of a preferred process of automatically perusing multiple product pages

FIG. 6 is a block diagram showing analysis data on a product.

FIG. 7 is a block diagram showing analysis data on a product page.

FIG. 8 is a block diagram showing analysis data on components of a product page.

DETAILED DESCRIPTION OF THE INVENTION

Figure 1:
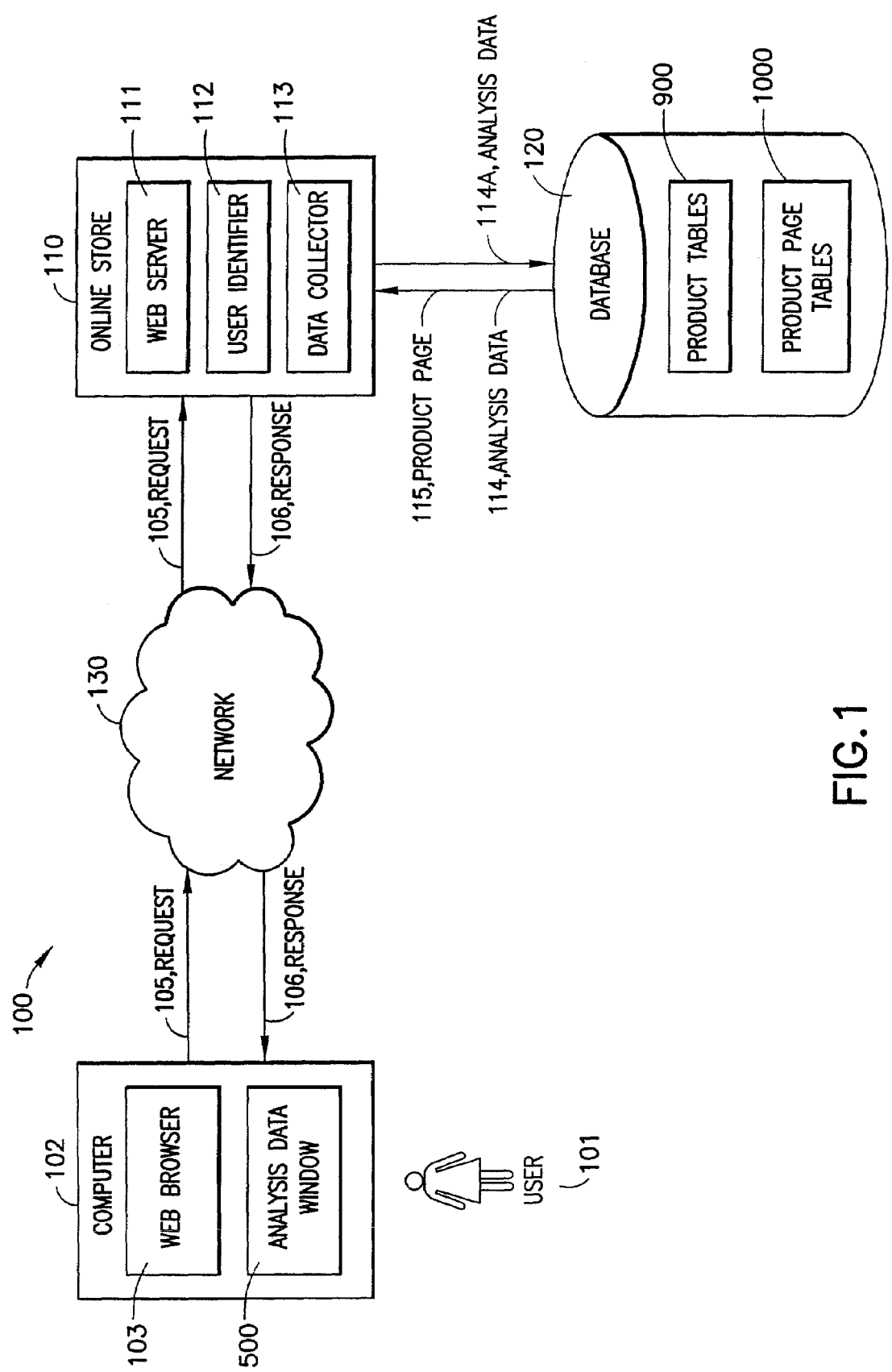
FIG. 1 is a block diagram of one preferred system architecture.

FIG. 1 (100) is a block diagram of one preferred system architecture showing one or more users (101), one or more computers (102) used by the users (101), one or more Web browser programs (103) used by the users (101), one or more analysis data windows (500) shown to the users (101), a computer network (130), one or more online stores (110) connected to the computer network (130), one or more Web server systems (111) of the online stores, one or more user identifier programs (112) of the online stores, one or more data collector systems (113) of the online stores, one or more database systems (120) of the online stores, one or more product tables (900) of the online stores, and one or more product page tables (1000) of the online stores. The users (101) are the merchants and/or business analysts of the online store (110). When a user (101) intends to review and/or analyze the products and product pages of his/her online store (110) by using this invention, he/she starts a Web browser program (103) in his/her computer (102) and visits his/her online store (110) in the computer network (130). In a preferred embodiment, online stores are implemented with a Web server system (111) which receives Web page requests (105) from users (101) and sends out requested Web pages (106) back to the users (101). For this communication, Web browser programs (103) and Web server systems (111) typically use HTTP (HyperText Transfer Protocol) which is a network protocol defined for that purpose.

A user (101) navigates his/her online store (110), i.e., requests Web pages over the network (130) and browses Web pages which provide information of one or more products sold in the store. A Web page that provides information about one or more products is referred to as a product page. When a user (101) requests a product page, the Web server (111) of the online store (110) retrieves the information of the selected product from the product table (900) stored in the database system (120), dynamically constructs a Web page by using the product information, and sends the created product page to the user (101). A collection of product pages provided by an online store is typically referred to as online product catalog. An example of a prior art product catalog of an online store will be described in FIG. 3 (300). The current invention presents an analysis data window (500) which automatically pops up when a user (101) browses a product page of his/her online store (110) and shows various analysis data of the product page, one or more products presented in the product page, and one or more Web design components presented in the product page.

Figure 2:
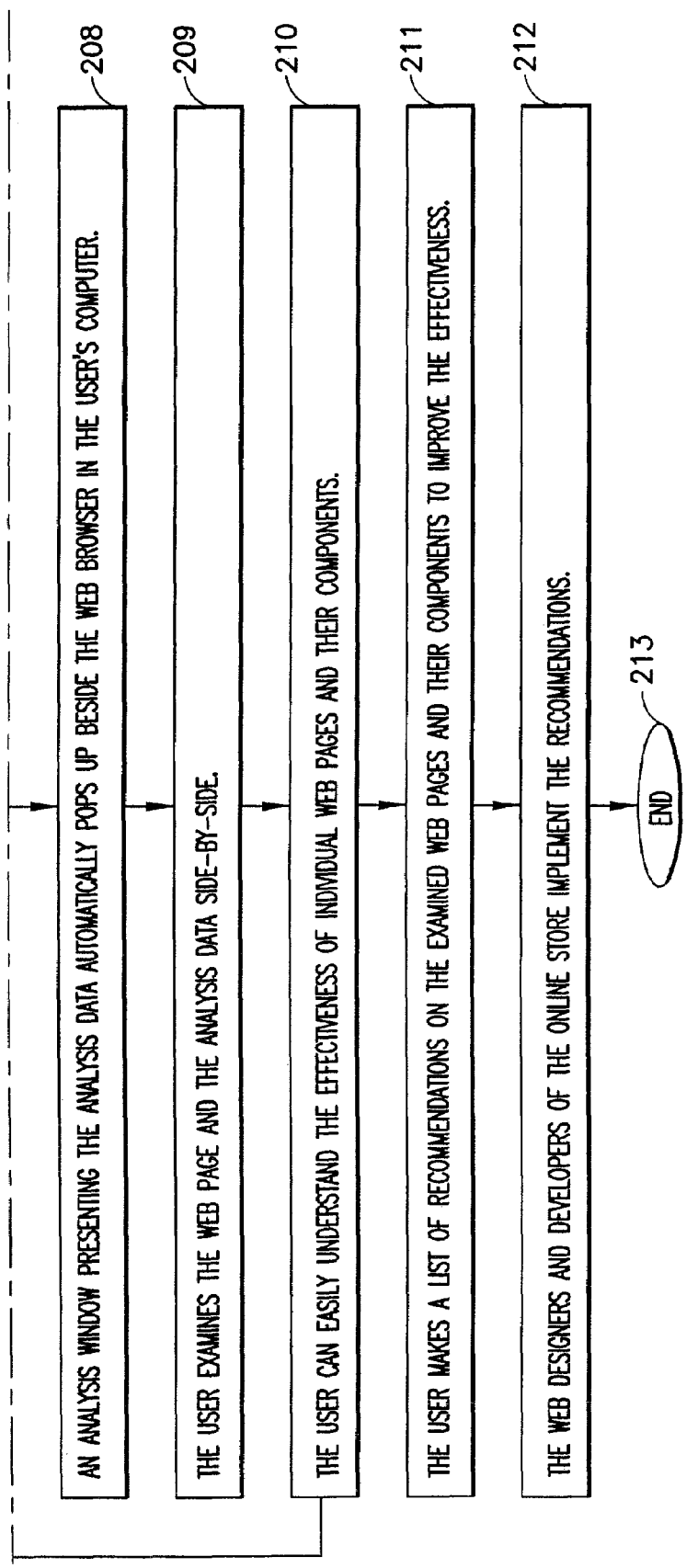
FIG. 2 is a flow chart of a preferred business process.

FIG. 2 (200) is a flow chart of a preferred business process showing how the analysis data window (500) can help users (101) examine product pages and their components along with analysis data associated with them in a single computer screen. First (202), a user (101), i.e., a merchant or business analyst of an online store starts a Web browser program (103) in his/her computer (102) to examine one or more product pages in his/her online store (110) in the Internet (130). It is assumed that the online store (110) provides the analysis data window service which is the subject of this invention. The user (101) sends a Web page request (105) to the Web server system (111) of the online store (110) to receive a product page he/she wants to examine (203). The Web server system (111) of the online store (110) retrieves necessary product data from the product table (900) from the database (120) and generates the requested product page (204).

In the meantime, the Web server system (111) of the online store (110) finds if the user (101) is a merchant and/or business analyst of the online store (205). For this, the online store uses a user identifier module (112) which works as part of the Web server system (111) and identifies senders of Web page requests (105) by examining the "cookie" value of the sender. A cookie is a piece of information shared between a user's Web browser (103) and a Web server (111), originating as a message sent by a Web server to the Web browser visiting the server's site, subsequently stored in a text file on the user's hard drive, and sent back to the server each time the browser requests a page from the server. If the Web server (111) finds that the user (101) who made the Web page requests is indeed a merchant and/or business analyst of the online store, it retrieves analysis data from the product table (900) and the product page table (1000) from the database (120) and generates an analysis data page associated with the request product page (206). The Web server (111) sends the requested product page and associated analysis data page together back to the user (207).

In the user's computer (102), the product page is displayed in the Web browser (103). At the same time, the associated analysis data page is presented in the analysis data window (500). When the user first starts the Web browser program (103), the analysis data window (500) is initially not started. When the user receives the first requested product page, the analysis data window (500) is automatically started, is placed beside the Web browser (103), and displays analysis data associated with the product page presented in the Web browser (208). Therefore, the user (101) can examine the product page and it components along with various analysis data associated with them side-by-side in a single computer screen (209), and understand the effectiveness of individual Web pages and their components with ease (210). Whenever the user (101) requests a product page of the online store, corresponding analysis data is also generated and presented together with the product page. Examining product page and associated analysis data together, the user (101) can make a list of recommendations on the examined product pages and their components to improve the effectiveness and the revenue of the online store (211). The recommendations by the user (101) can be implemented by Web designers and developers in various of channels and processes of the online store's marketing and merchandising efforts including Web pages of the online store.

The analysis data is collected and processed by the data collector module (113) of the online store (110) and is stored in the product table (900) and the product page table (1000) in the database (120). System and method for collecting and processing the analysis data of online store has general applications in the analysis of Web site performance and is further described and claimed in U.S. patent application Ser. No. 09/238,861, entitled A SYSTEM AND METHOD FOR COLLECTING AND ANALYZING INFORMATION ABOUT CONTENT REQUESTED IN A NETWORK (WORLD WIDE WEB) ENVIRONMENT, filed on Jan. 27, 1999, which is herein incorporated by reference in its entirety.

Figure 2A:
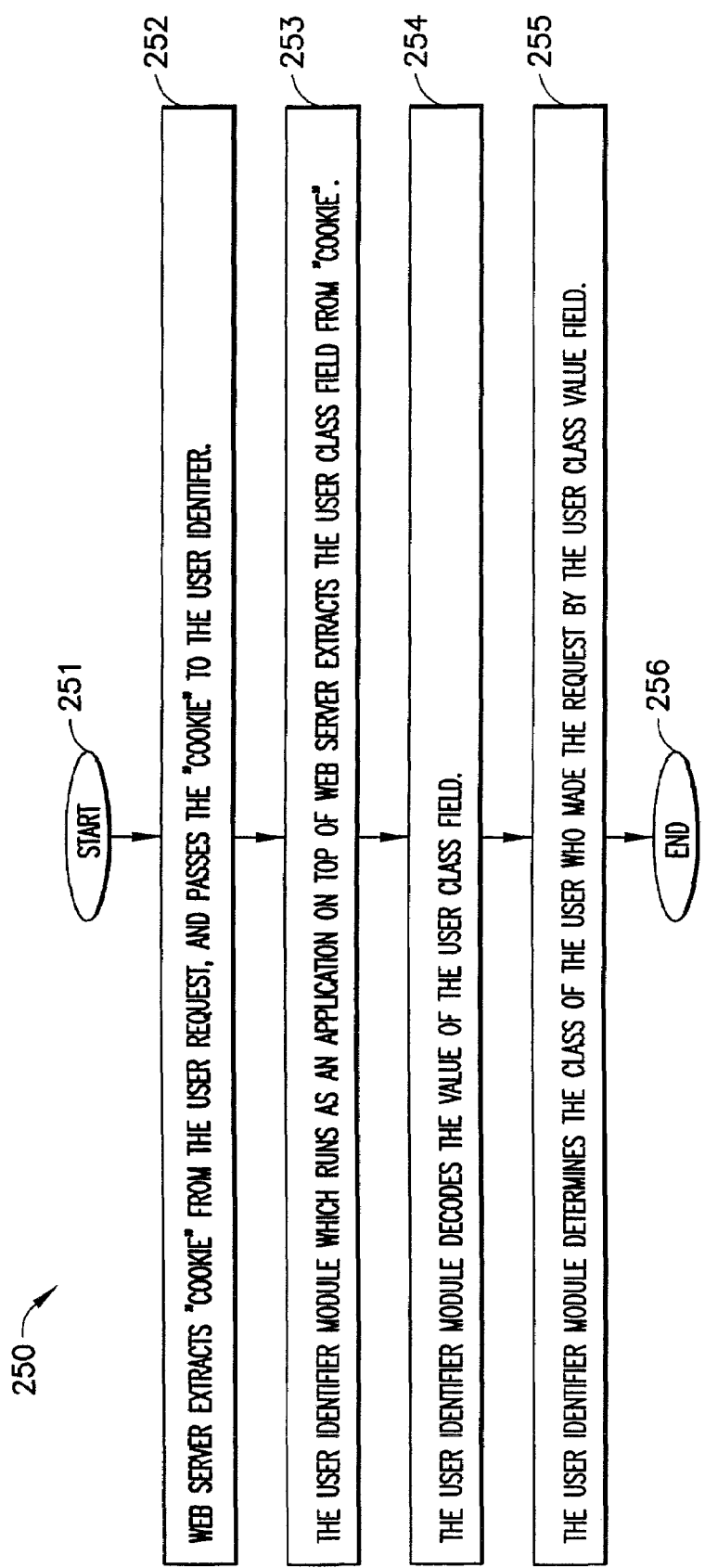
FIG. 2A is a flow chart of a preferred process of identifying user class.

FIG. 2A (250) is a flow chart of a preferred process of identifying user class showing how the user identifier module (112) finds if the user who makes a request (105) of a product page (115) is an analyst of the online store. One preferred method is to use "cookies". A cookie is a piece of information shared between a user's Web browser and a Web server, originating as a message sent by a Web server (111) to the Web browser (103) visiting the server's site, subsequently stored in a text file on the user's hard drive, and sent back to the server each time the browser requests a page from the server. A cookie can store information about user class, and that piece of information can be used by the user identifier module (112) as described in this flow chart. When the Web server (111) of an online store (110) receives a request (105) from a user (101), it extracts "cookie" from the request as cookies are attached to user requests and then passes the cookie to the user identifier module (252). The user identifier module (112) which runs as an application on top of the Web server (111) extracts from the cookie the user information field (253). The user information field can have various information about the user who made the request (105) and have several subfields for each individual piece of information. The user information in the cookie includes user name, password, user class, customer number, among others. Some of them may be encrypted for a security reason. The user identifier module (112) extracts the user class subfield from the cookie, and decode the information if necessary (254). The user class subfield provides the information about the user class. If the user is a customer of the store, the field specifies "customer". If the user is an administrator, marketer, merchandiser, Web designer, or owner of the online store, the user class field specifies so. If the user is an analyst, the field specifies so. This user class information is initially determined at the time of user registration and stored in the online store's user database. Later, it is retrieved from the database and inserted into cookie, as the user starts using the online store.

Until now, this invention focuses on provision of analysis data in a separate window as users (analysts) browses product pages of an online store one by one. We assume that analysts of an online store are interested in perusing analysis data along with corresponding product pages. Likewise, different user classes may be interested in viewing different types of data along with product pages. For example, marketers and merchandisers of an online store may want to review how their marketing and merchandising-related efforts are presented in product pages and what result they produced. Web designers may want to review how changes to product pages are presented and what effect they made. Because it is possible to store the user class information in cookies, and also because the user identifier module (112) can identify user class by using that piece of information, we can extend this invention to provide different sets of auxiliary information in a separate window to different classes of users. This invention is perfected by the fact that the data collector module (113) can be adjusted to collect various sets of information from the served Web pages that may be interesting to various classes of users as well as to store analysts. A system and method for collecting and processing various analysis data of online store is further described and claimed in U.S. patent application Ser. No. 09/238,861, which was cited earlier.

Figure 3:
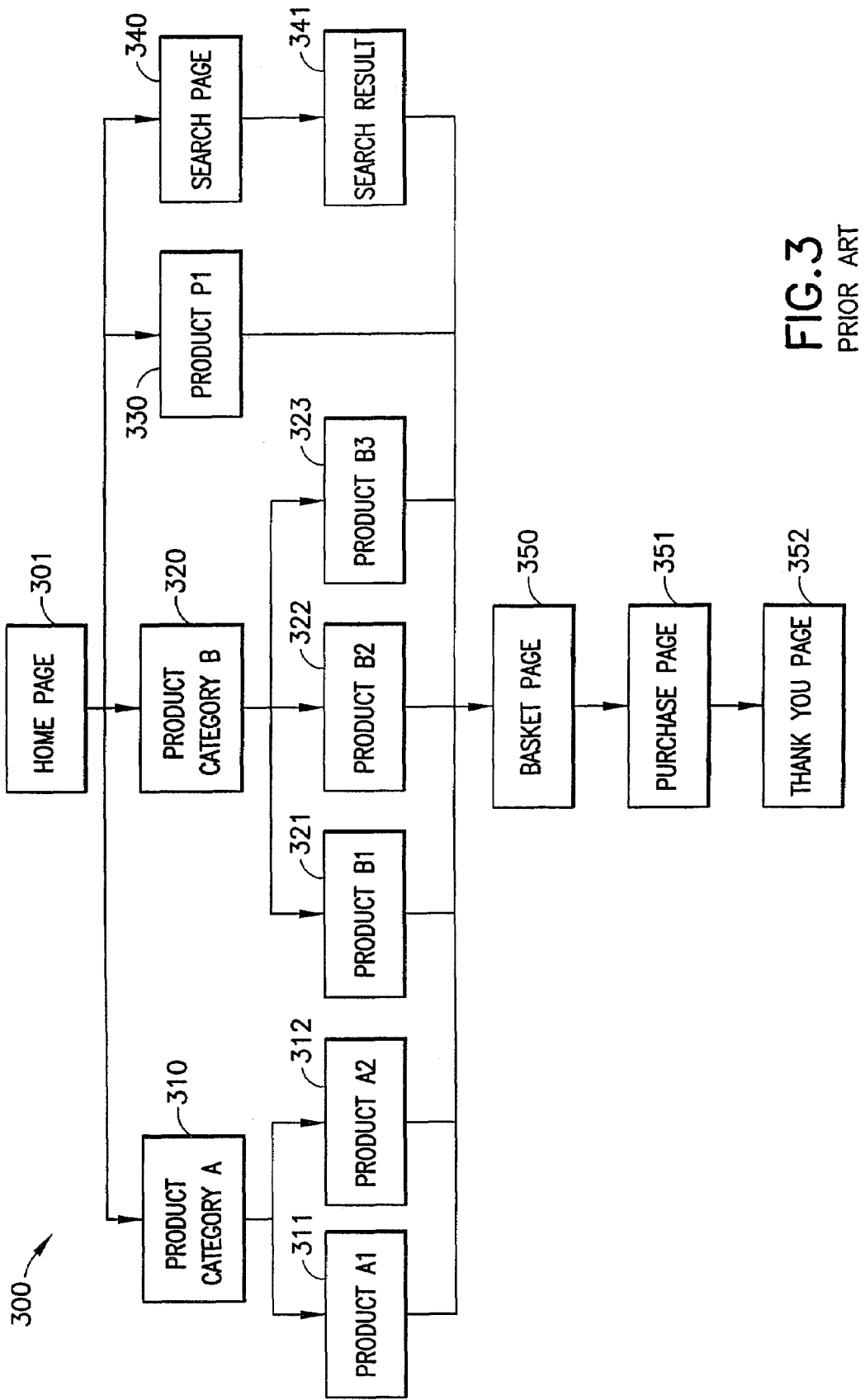
FIG. 3 is an example of a prior art product catalog of an online store.

FIG. 3 (300) is an example of a prior art product catalog of an online store and its structure showing Home page (301), Product category A (310), Product category B (320), Product P1 (330) which is promoted in the Home page (301), Search (340) and Search Result page (341), Product A1 (311) and A2 (312) which belong to product category A (310), Product B1 (321), B2 (322) and B3 (323) which belong to product category B (320), Shopping basket page (350), Purchase page (351), and Thank you page (352). An arrowhead line between two boxes in the figure means that there is a link from the source page to the destination page so that a shopper can directly access the destination page from the source page. That is, a Web page contains hyperlinks in it to all the destination pages which are accessible from this page. For example, Product P1 page (330) is directly accessible from Home page (301), but not from Product A1 page (311). Also, Home page (301) contains hyperlinks to four different Web pages, Product category A (310), Product category B (320), Product P1 (330), and Search page (340). Product P1 page (330) contains only one hyperlink to Basket page (350). Note that Search Result page (341) is a dynamic page whose content changes based on the keywords used in the Search page (340). The Search Result page (341) can contain zero or more hyperlinks to product pages in addition to a hyperlink to Basket page (350). Product catalogs of online stores (110) comprises many product pages, each product page presenting only a small set of products, e.g., one or a few which tend to belong to the same or similar product category. Hence shoppers usually need to browse multiple pages to find information about one or more products of interest.

Figure 4:
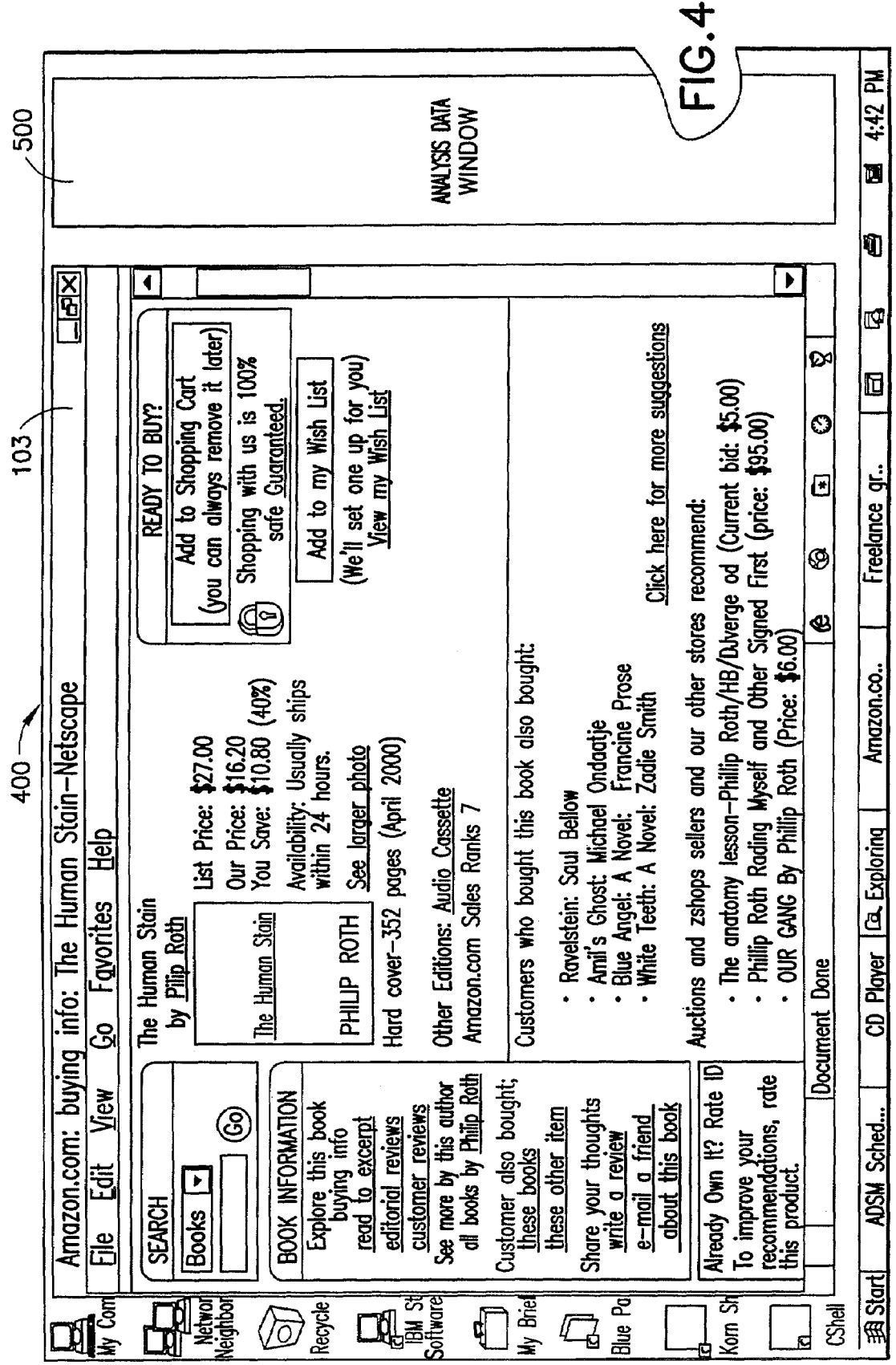
FIG. 4 is a screen shot showing a product page with its analysis data window.

FIG. 4 (400) is a screen shot of a computer screen (102) showing a product page with its analysis data window. As explained earlier, a product page is displayed in the Web browser program (103) while analysis data associated with the displayed product page is shown in the analysis data window (500). An analysis data window (500) is placed side-by-side with the Web browser (103) in the computer screen (102), so that the users (101) can examine the analysis data of product pages with ease. A product page presents one or more products and their information including the product name, one or more images of the product, product price, one or more description of the product, and one or more attributes of the product. Also, a product page presents one or more supporting features such as search, registration and express checkout. In addition, a product page provides one or more hyperlinks to shopping carts and other related product pages and categories.

FIG. 4A is a flow chart of a preferred process of automatically perusing multiple product pages. Until now, this invention describes that the user, i.e., store analyst (101) uses Web browser (103) to view one or more product pages along with their analysis data. A store analyst needs to browse the store frequently to understand the performance of the store, individual product categories, and individual products. When the number of products presented and sold in the store is large, the process of manually browsing product pages and analysis data on Web browser (103) becomes inefficient. FIG. 4 describes a software program called product page peruser that can help the situation by automatically reviewing multiple product pages and their analysis data based on a given set of criteria, and presenting one or more subsets of product pages that may be of particular interest to the user, i.e., store analyst.

When the product page peruser program starts (452), it provides a user interface which the user (101) can use to specify various criteria for selecting interesting product pages (453). The criteria for product page selection can be diverse. The user can specify one or more particular changes in count measures (602) and sales measures (604) for one or more particular dimensions (601), e.g., period of time, customer profile, merchandising cues and shopping metaphors. Also the user can specify one or more sets of product pages updated since a particular point of time, to review the effect of the changes to count and sales measures.

Once criteria for product page selection is given, the product page peruser program automatically downloads individual product pages from the online store along with their analysis data (454). The downloading of analysis data is possible because the peruser program inherits the user class information of the user as an analyst. The peruser program parses the content of the downloaded product page and its analysis data to determine if the page meet the criteria given by the user in the previous step (455). This product page selection can be done as background process, while the user uses his/her computer for other purposes.

When the peruser program completes the selection process, it creates a list of selected product pages with their analysis data summary and hyperlinks that can be used to retrieve the product pages on the Web browser (456). The peruser program presents the list to the user (457), and the user reviews the list to determine product pages of interest by viewing the analysis data summary presented together (458). When the user want to view one or more product pages from the given list, the user simply clicks on the corresponding hyperlinks given in the same list, and then the Web browser (103) starts automatically and retrieves the selected product page along with its analysis data in a separate analysis data window (459). In this way, the user can examine the interesting product page and its analysis data more closely (460), and understand the effectiveness of the product page and their components (461). If the user wants to review a different set of product pages, then he/she can use the user interface of the peruser program again to specify a new selection criteria for product pages (463).

Figure 5:
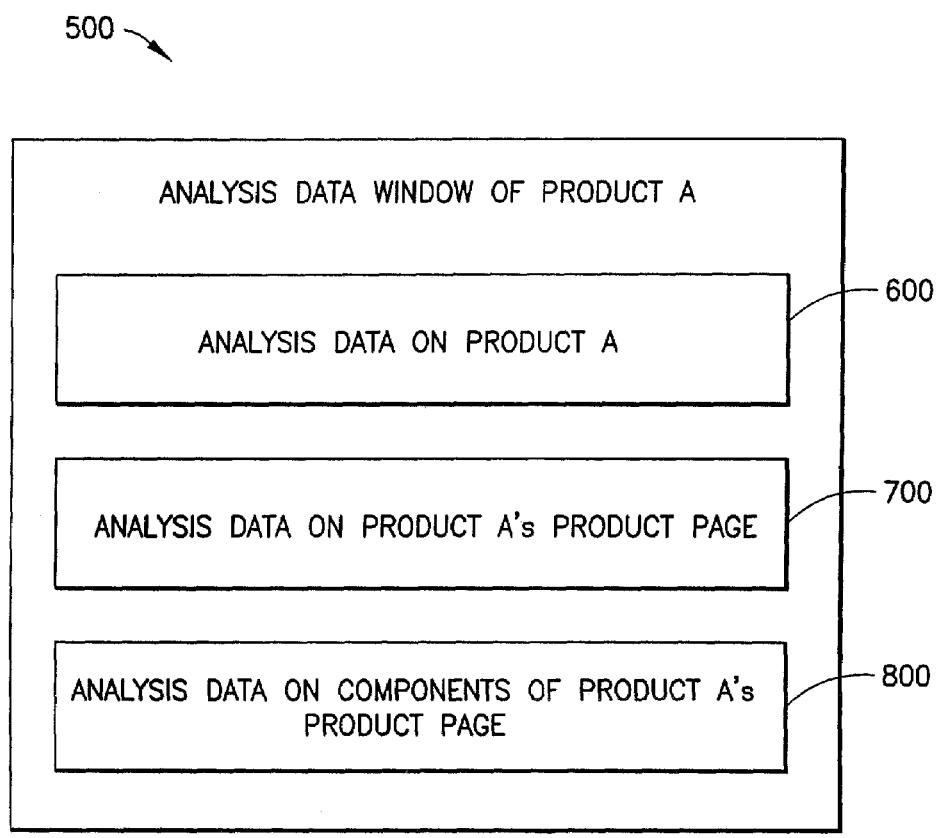
FIG. 5 is a block diagram showing an analysis window of a product.

FIG. 5 (500) is a block diagram showing an analysis window of a product. A preferred embodiment of an analysis data set for a product comprises three parts: analysis data of the product (600), analysis data of the product page presenting the product (700), and analysis data of the components shown in the product page presenting the product (800).

FIG. 6 (600) is a block diagram showing analysis data of a particular product. There are three different types of data that helps understand the performance of this product: a set of measures (602, 603, and 604) which are the object of measurement, a set of dimensions (601) which provides the context for the measurement data, and a set of supporting data (605). This figure shows two different types of measure data: count measures (602) and sales measures (604). The count measures include the number of basket placements, purchases and returns of this product, while the sales measures include the total sales value and profit in dollar amount. The derived measures (603) are one that can be computed from the basic count measures (602), and show the ratio among steps in the count measures. For example, the ratio of purchases to basket placements shows what percentage of basket placements are converted to purchases.

This FIG. (600) presents these measures in a context which is specified by the dimension data (601). That is, the presented measures are for a month, May 2000 (time dimension), for the entire customer set, not just one or two customer segments such as female customers (customer dimension), for the promotion A which was campaigned in May 2000 (merchandising cue dimension), and for all types of shopping metaphors, not just browsing or search (shopping metaphor dimension).

Finally, this preferred embodiment (600) shows average price and average profit margin as example of supporting data (605). Average values are used for this data because pricing is often dynamically changing especially in online stores.

Analysis data shown in this FIG. (600) and the following FIGS. 7 (700) and 8 (800) is only a small subset of analysis data that can help online merchants and/or business analysts understand the effectiveness of individual products and product pages of their online store. Types of data presented in the analysis window are not limited by this subset described in this preferred embodiment. To cope with different analysis needs, different types of data such as product cost, inventory data, order fulfillment data, customer data, average length of stay in product pages, and types of effective design features (text, image, animation, font, size, color, and location in Web page) can be presented in the analysis data window (500). Also, presentation of the analysis data may use different forms to make the report easy to analyze and understand. Tables, data visualization such as graphs, and spreadsheets are a few possible examples.

FIG. 7 (700) is a block diagram showing analysis data on a particular product page. Like the analysis data of a product, the analysis data of a product page comprises three different types of data: the dimension data (701), the measurements including the count measures (702), the derived measures (703) and sales measures (704), and the supporting data set (705). The dimension data (701) and the supporting data (702) in this FIG. (700) are similar to their corresponding parts in the previous FIG. (600) and do not need further explanation.

The count measures of a product page comprises the number of impressions and clickthroughs (702). The product page impression is the view of hyperlink to the Web page presenting the product, while the clickthrough is the click on the hyperlink and view the Web page of the product. As in the previous FIG. (600), the derived measures (703) include ratio among various steps given in the count measures (602 and 702) of products and product pages. For example, the ratio of purchase to impression is the percentage of impressions of this product page converted to purchase. This measure is a useful to understand the effectiveness of hyperlinks of this product page shown in the online store. Similarly, the ratio of purchase to clickthrough is the percentage of impressions of this product page converted to purchase, and is a useful measure indicating the effectiveness of the product page. Sales measures (704) are the total sales value and profit in dollar amount generated through this particular product page. Data presented in FIGS. 6 and 7 can be combined, especially when there is one-to-one mapping between product and product pages, i.e., a product page displays only one product and a product is presented in only one product page. In many online stores, this is not the case. A product page often displays more than one products. Also, a product is presented in more than one product page.

FIG. 8 (800) is a block diagram showing analysis data on components of a product page. As explained earlier, a product page may provide various applications and hyperlinks in addition to information directly related to the displayed product(s). This section (800) of the analysis data window (500) shows the analysis data of such applications and hyperlinks of product pages. Examples of applications provided in a product page include search service, registration, mail to friends service, and express checkout. Examples of hyperlinks provided in a product page include ones to related, recommended, and/or promoted products. Also, these applications and hyperlinks are associated with some Web design features such as media type (i.e., image or text), font (if text), size, color, and location. The analysis data presented in this section (800) is useful to understand the effectiveness of such Web design features. This FIG. (800) show analysis data of a couple of hyperlinks, one is a banner ad, and the other a cross-sell of a product. As for other analysis data set, this one comes with a dimension data set to give a context of the measurement data.

Figure 9:
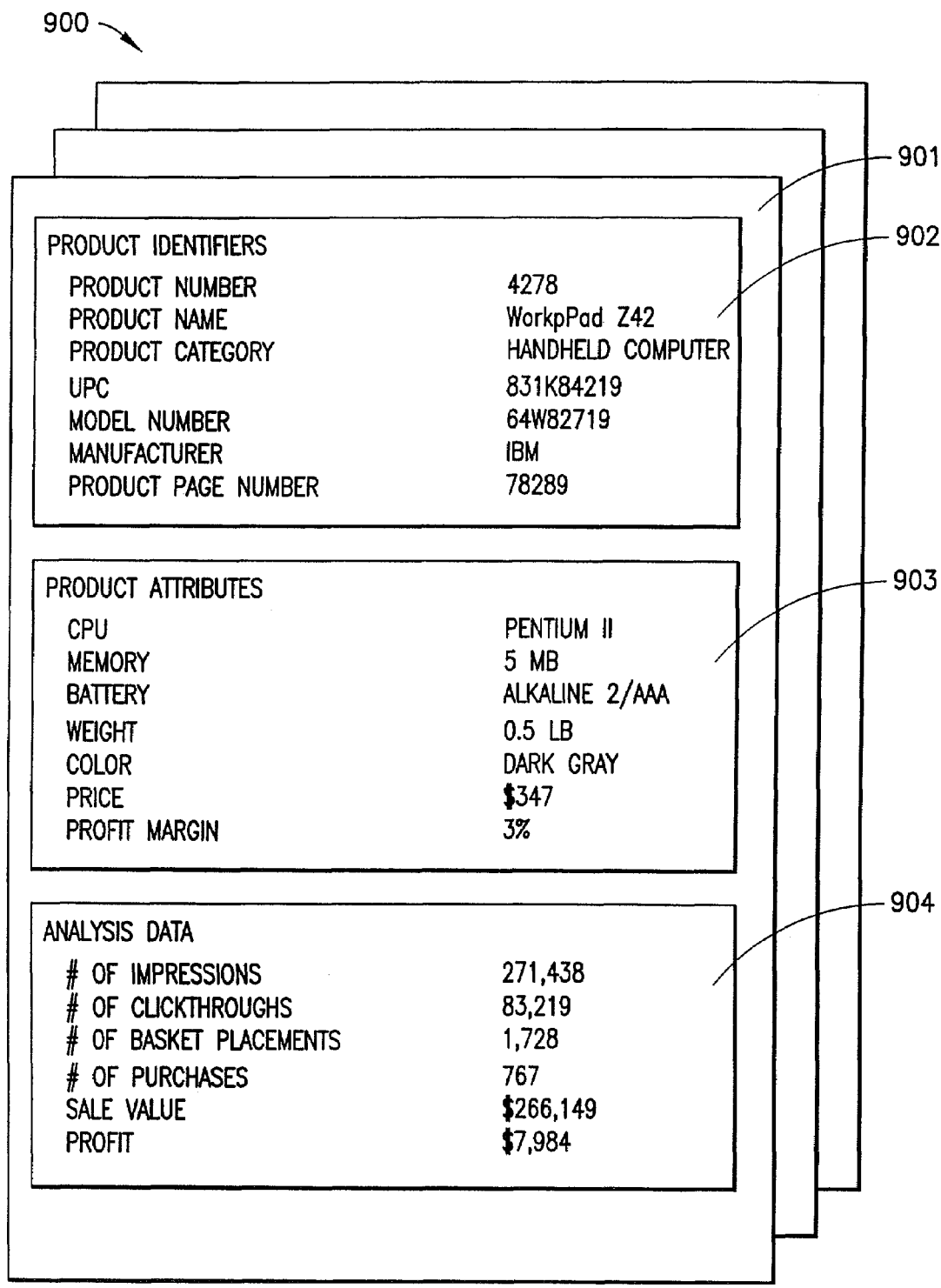
FIG. 9 is a block diagram showing a product table.

FIG. 9 (900) is a block diagram showing a preferred embodiment of the product table comprising a number of product records (901), each of which consists of three parts: product identifiers (902), product attributes (903), and analysis data (904). The product identifier section (902) provides the product id number, product name, product category, UPC (Universal Product Code), model number, manufacturer, and the number of the Web page presenting this product. The product attribute section (903) shows various attributes of the product and their values. In this example, several attributes of a handheld computer are given including CPU, memory, battery, weight, color, price and profit margin. Finally, the analysis data section (904) provides data that are needed to generate the analysis data of a particular product (600). As explained earlier, the Web server (111) of an online store (110) will retrieve data from the product table (900) in the database (120) to generate product pages and portion of analysis data pages.

Figure 10:
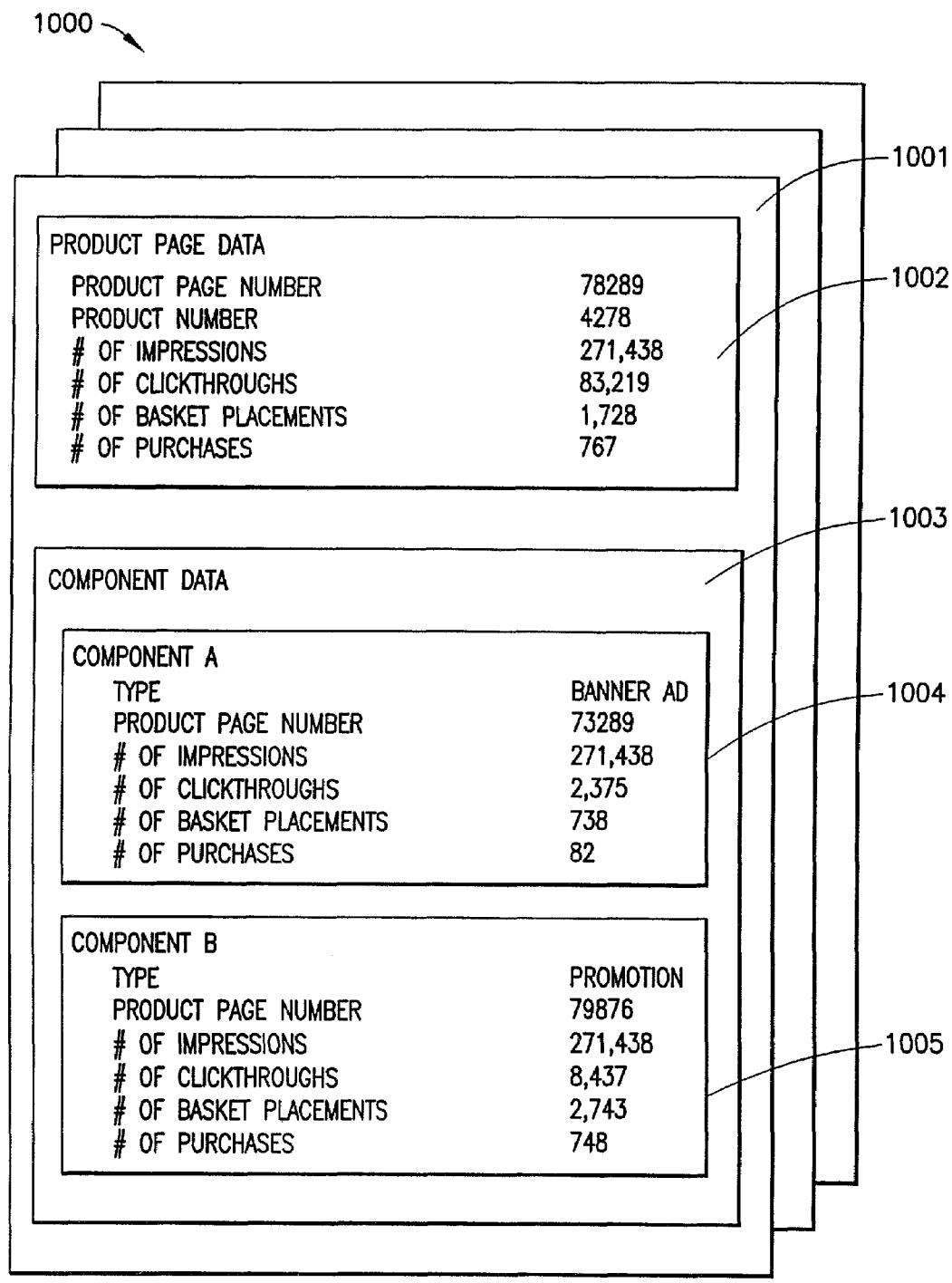
FIG. 10 is a block diagram showing a product page table.

FIG. 10 (1000) is a block diagram showing a preferred embodiment of the product page table comprising a number of product page records (1001), each of which comprises two parts: the product page data section (1002) and the component data section (1003). The product page data section (1002) provides the product page id number, product id number, and one or more count measures of the product page. The component data section (1003) comprises one or more components, each of which provides analysis of the component with the id number of the product

I claim:

1. A computer interface to an online store comprising:
   one or more product pages that have product information about one or more products, the product information obtained from the online store; and
   an analysis data window that has analysis data about effectiveness of a respective one of the one or more product pages, a type of analysis data being determined automatically by determining a type of analyst that uses the interface and the analysis data window presented concurrently with and in proximity to the respective product page.

2. An interface, as in claim 1, where the type of analyst includes any one or more of the following: an administrator, a marketer, a merchandiser, a Web designer, a store owner of the online store, a system analyst, a product analyst, and a sales analyst.

3. An interface, as in claim 1, where the analysis data window further comprises any one or more of the following types of analysis data: analysis data on one or more products on the product page, analysis data on one or more of the product pages, and analysis data on one or more components of one or more of the product pages.

4. An interface, as in claim 1, where the analysis data window comprises analysis data on one or more products on the product page and the analysis data comprises any one or more of the following: one or more conversion rates, one or more count measure conversion rates, one or more derived measure conversion rates, one or more sales measures, one or more dimensions, one or more time dimensions, one or more customer dimensions, one or more merchandising cue dimensions, one or more shopping metaphors, one or more product category dimensions, one or more basket placement counts, one or more purchase counts, one or more return counts, a ratio of purchases to number of basket placements, a ratio of number of returns to number of purchases, a sales value, a profit, an average price, and an average profit margin.

5. An interface, as in claim 1, where the analysis data window comprises analysis data on one or more product pages and the analysis data comprises any one or more of the following: one or more conversion rates, one or more count measure conversion rates, a number of impressions, a number of clickthroughs, one or more derived measure conversion rates, a number of clickthroughs per number of impressions, a number of basket placements per number of clickthroughs, a number of purchases per number of basket placements, a number of purchases per number of impressions, a number of purchases per number of clickthroughs, one or more sales measures, one or more dimensions, one or more time dimensions, one or more customer dimensions, one or more merchandising cue dimensions, one or more shopping metaphors, one or more product category dimensions, one or more basket placement counts, one or more purchase counts, a sales value, a profit, an average price, and an average profit margin.

6. An interface, as in claim 1, where the respective product page is a web browser page.

7. An interface, as in claim 6, where one or more components of the respective product page is a hyperlink to one or more other product web pages.

8. An interface, as in claim 7, where the one or more components of the Web browser page displaying the selected product are any one or more of the following: one or more products, product pages, hyperlinks, Web applications, and Web design features.

9. An interface, as in claim 8, where the Web applications are one or more of search, shopping cart placement, registration, checkout, mail to friend, wish lists, gift registries, calendars, custom-configuration of products, buyer's groups, chatting, e-mail notification, and in-context sales.

10. An interface, as in claim 8, where the Web design features are one or more of media type, font, size, color, and location.

11. A method comprising the steps of:
   providing on a user interface one or more product pages that have product information about one or more products, the product information obtained from an online store; and
   providing on the user interface an analysis data window that has analysis data about effectiveness of a respective one of the one or more product pages, a type of analysis data determined by a user that uses the interface and the analysis data window presented concurrently with and in proximity to the respective product page, the user being in a user class and the type of analysis data being determined automatically by determining the user's user class.

12. A method, as in claim 11, where the user class includes any one or more of the following: a customer, a merchant, a business analyst, a marketer, a merchandiser, an administrator, a programmer, and a Web designer.

13. A method, as in claim 11, where the user is registered to the online store by the user's role in the store.

14. A method, as in claim 11, where a selected one of the one or more product pages is a web browser page.

15. A method, as in claim 14, where the analysis data is presented in the analysis data window concurrently with and in proximity to the web browser page on the interface.

16. A method, as in claim 15, where the analysis data window is produced by a software program that starts automatically when the user requests the web browser page of a selected product.

17. A method, as in claim 16, where the analysis data window software program automatically starts only when the user is a member of a selected user class which affiliates with the online store.

18. A method, as in claim 11, where the user class of the user making a request to the online store is identified by the store before the analysis data window is provided on the interface.

19. A method, as in claim 18, where the user class is examined by using a subfield of a "cookie" that is attached to the request.

20. A method, as in claim 11, further comprising a perusal step that automatically browses and filters a set of product pages and their analysis data based on a profile of the user.

21. A method, as in claim 20, where the perusal step provides in the interface one or more criteria of filtering one or more product pages.

22. A method, as in claim 21, where the criteria of filtering is based on any one or more the following: one or more attributes of the pages, one or more components of the pages, and one or more of the analysis data.

23. A method, as in claim 20, where the product page perusal step automatically retrieves specified product pages and the respective analysis data from the online store.

24. A method, as in claim 20, where the product page perusal step parses the content of retrieved product pages and the respective analysis data, and selects product pages that meet one or more criteria given by the user.

25. A method, as in claim 20, where the product page perusal step creates a list of selected product pages that contains page name, analysis data summary, and hyperlink for each selected product page.

26. A method, as in claim 25, where the user can use the list of selected product pages created by the product page peruser program to manually examine product pages and their analysis data by using a web browser.

27. A computer program embodied on a computer readable medium and comprising computer program instructions for directing at least one computer to provide an interface to an online store, comprising:

first computer program instructions for defining and managing product pages each containing product information concerning at least one product of the online store; and second computer program instructions, responsive to stored analysis data that represents a historical record of use of the product pages by customers and potential customers of the online store and that indicates an effectiveness of the product pages, to display an analysis data window concurrently with and in proximity to a respective one of the product pages, where a specific type of analysis data that is displayed in the analysis data window is determined automatically by determining a type of analyst that uses the interface.

28. A computer program as in claim 27, where the type of analyst is determined automatically by extracting data from a user information field of a cookie.

29. A computer program as in claim 27, where the type of analyst is determined automatically by extracting data from a user class subfield of a cookie.

* * * * *